United States Patent
Paul et al.

(10) Patent No.: US 10,761,584 B2
(45) Date of Patent: Sep. 1, 2020

(54) SYSTEM AND METHOD TO ENABLE PREDICTION-BASED POWER MANAGEMENT

(71) Applicant: Vigyanlabs Innovations Private Limited, Mysore (IN)

(72) Inventors: Mousumi Paul, Howrah (IN); Srivatsa Krishnaswamy, Bangalore (IN)

(73) Assignee: Vigyanlabs Innovations Private Limited, Mysore (IN)

( * ) Notice: Subject to any disclaimer, the term of this patent is extended or adjusted under 35 U.S.C. 154(b) by 144 days.

(21) Appl. No.: 15/978,176

(22) Filed: May 13, 2018

(65) Prior Publication Data

US 2019/0286215 A1    Sep. 19, 2019

(30) Foreign Application Priority Data

Mar. 16, 2018    (IN) .............................. 201841009776

(51) Int. Cl.
| | |
|---|---|
| *G06F 1/3228* | (2019.01) |
| *G06N 3/08* | (2006.01) |
| *F24F 11/46* | (2018.01) |
| *F24F 11/62* | (2018.01) |
| *F24F 140/60* | (2018.01) |
| *F24F 120/00* | (2018.01) |
| *F24F 110/10* | (2018.01) |

(52) U.S. Cl.
CPC ............ *G06F 1/3228* (2013.01); *F24F 11/46* (2018.01); *F24F 11/62* (2018.01); *G06N 3/08* (2013.01); *F24F 2110/10* (2018.01); *F24F 2120/00* (2018.01); *F24F 2140/60* (2018.01)

(58) Field of Classification Search
CPC ................................................... G06F 1/3228
See application file for complete search history.

(56) References Cited

U.S. PATENT DOCUMENTS

| | | |
|---|---|---|
| 5,410,713 A | 4/1995 | White et al. |
| 5,710,929 A | 1/1998 | Fung |
| 5,784,628 A | 7/1998 | Reneris |
| 5,790,877 A | 8/1998 | Nishiyama et al. |
| 6,131,166 A | 10/2000 | Wong-Insley |
| 6,173,409 B1 | 1/2001 | Watts, Jr. et al. |
| 6,219,796 B1 | 4/2001 | Bartley |
| 6,574,738 B2 | 6/2003 | Jain et al. |

(Continued)

*Primary Examiner* — Kim Huynh
*Assistant Examiner* — Eric Chang
(74) *Attorney, Agent, or Firm* — Rahman LLC (57) ABSTRACT

A system and method configured with an electronic device to enable prediction-based power management by providing direct transition to a lower power state such that overall energy consumption is reduced. The system and method includes an idleness information recording module configured to, using a power management agent, non-intrusively observe and record usage and idleness information of the electronic device, a learning module configured to, using a neural network operatively coupled with the power management agent, conduct deep learning of idleness patterns of the electronic device, a prediction module configured to predict future idleness of the electronic device based on the deep learning of the idleness patterns, and a prediction-based lower power state transfer module configured to directly transition the electronic device to lower power state based on the predicted future idleness.

18 Claims, 9 Drawing Sheets

(56) References Cited

U.S. PATENT DOCUMENTS

| | | |
|---|---|---|
| 6,583,947 B1 | 6/2003 | Hakamata et al. |
| 6,788,156 B2 | 9/2004 | Tam et al. |
| 6,859,882 B2 | 2/2005 | Fung |
| 7,272,735 B2 | 9/2007 | Fung |
| 7,308,591 B2 | 12/2007 | Dubinsky |
| 7,353,413 B2 | 4/2008 | Dunstan |
| 7,689,851 B2 | 3/2010 | Sawyers et al. |
| 7,870,404 B2 | 1/2011 | Read et al. |
| 8,201,007 B2 | 6/2012 | Varadarajan |
| 8,281,166 B2 | 10/2012 | Carroll |
| 8,495,393 B2 * | 7/2013 | Oh .................. G06F 1/3203 709/226 |
| 9,098,261 B2 | 8/2015 | Sistla et al. |
| 9,170,624 B2 | 10/2015 | Sistla et al. |
| 9,477,281 B2 | 10/2016 | Varadarajan et al. |
| 9,690,353 B2 | 6/2017 | Moran et al. |
| 2003/0139828 A1 * | 7/2003 | Ferguson ............ G05B 13/048 700/53 |
| 2007/0245163 A1 | 10/2007 | Lu et al. |
| 2011/0055830 A1 | 3/2011 | Kamay et al. |
| 2011/0187193 A1 * | 8/2011 | Pan .................... H02J 3/14 307/39 |
| 2013/0024708 A1 | 1/2013 | Goodrum et al. |
| 2016/0004296 A1 | 1/2016 | Haj-Yihia et al. |
| 2018/0232036 A1 | 8/2018 | Varadarajan et al. |
| 2019/0155368 A1 * | 5/2019 | Branover ............ G06F 1/3287 |

\* cited by examiner

SYSTEM AND METHOD TO ENABLE PREDICTION-BASED POWER MANAGEMENT

CROSS-REFERENCE TO RELATED APPLICATION(S)

This application claims the benefit of Indian Patent Application No. 201841009776, filed on Mar. 16, 2018, the complete disclosure of which, in its entirety, is herein incorporated by reference.

BACKGROUND

Technical Field

The embodiments herein generally relate to power management systems, and more particularly to systems, methods, and computing devices that can enable prediction-based power management.

DESCRIPTION OF THE RELATED ART

A variety of techniques have been developed to enable power management in a device in order to control overall energy consumption. However, most of the techniques suffer from various deficiencies. For example, certain intrusive activities may be observed due to the lack of an optimal pre-configuration as the power policy set by an administrator may not be suitable for different usage pattern and priorities. Further, idleness of a device can be wrongly perceived as certain applications may not be considered as an activity of the device. Also, certain techniques can be specific to architecture of a processor or a device and cannot be applied across multiple architectures and models that are prevalent in a large enterprise. Additionally, various techniques applied to smart devices enable transition from a higher power state to a lower power state by following a sequence of state transitions with their pre-configured delays, which may cause reduction in power saving efficiency.

SUMMARY

In view of the foregoing, the embodiments herein provide a system, method and computing device that can enable prediction-based power management by providing direct transition to a lower power state such that overall energy consumption can be reduced.

An aspect of the embodiments herein pertains to a system configured in an electronic device to enable prediction-based power management of the electronic device. The embodiments herein can include an idleness information recording module configured to, using at least one power management agent, non-intrusively observe and record usage and idleness information of the electronic device so as to enable updating of an idleness database storing information based on when the electronic device is idle, wherein the at least one power management agent can be operatively coupled with a power management server through a communication channel; a learning module configured to, using a neural network operatively coupled with the at least one power management agent, conduct deep learning of one or more idleness patterns of the electronic device, the one or more idleness patterns being analyzed based on machine training conducted by the neural network on the idleness database; a prediction module configured to predict future idleness of the electronic device based on the deep learning of the one or more idleness patterns; and a prediction-based lower power state transfer module configured to directly transition the electronic device to lower power state based on the predicted future idleness.

In an embodiment, the at least one power management agent can maintain a list of any of a combination of applications, tasks, and activities configured in the electronic device and a dependency of the applications, tasks, and activities on one or more power manageable components of the electronic device. In an embodiment, the electronic device can include a computing device, and wherein the idleness information can be determined based on inputs from any of a keyboard, mouse, biometric sensor, camera, touch screen, stylus, voice sensor, motion sensor, proximity sensor, and thermal sensor of the computing device when running without user interaction, when the computing device is in a standby mode, and when the computing device is switched off.

In an embodiment, the electronic or computing device can include a heating, ventilation, and air conditioning (HVAC) device, and wherein the idleness information can be determined based on inputs from any of a temperature sensor, occupancy sensor, ambient light sensor, image sensor, and a movement recognition sensor. In an embodiment, recordation of the idleness information in the idleness database can include recordation of a timestamp and idleness duration.

In an embodiment, the prediction-based lower power state transfer module can further be configured to, when the electronic device enters an idle state and based on a predicted time-span for which the electronic device would remain in the idle state, transfer the electronic device to a lower power state. In an embodiment, outlier idleness patterns can be discarded before the future idleness is predicted.

In an embodiment, the non-intrusive observation and recordation of the usage and the idleness information of the electronic device can be performed based on any of whether any power manageable component of the electronic device is idle, whether any application is dependent on any power manageable component, and whether any application dependent on any power manageable component is active.

Another aspect of the embodiments herein pertains to a computing device including a non-transitory storage device having embodied therein one or more routines configured to enable prediction-based power management of the computing device; and one or more processors coupled to the non-transitory storage device and configured to execute the one or more routines, wherein the one or more routines can include: an idleness information recording module, which when executed by the one or more processors, through at least one power management agent, non-intrusively observes and records usage and idleness information of the computing device so as to enable updating of an idleness database storing information based on when the computing device is idle, wherein the at least one power management agent can be operatively coupled with a power management server through a communication channel; a learning module, which when executed by the one or more processors, using a neural network operatively coupled with the at least one power management agent, conducts deep learning of one or more idleness patterns of the computing device, the one or more idleness patterns being analyzed based on machine training conducted by the neural network on the idleness database; a prediction module, which when executed by the one or more processors, predicts future idleness of the computing device based on the deep learning of the one or more idleness patterns; and a prediction-based lower power state transfer module, which when executed by the one or more processors, directly transitions the computing device to a lower power state based on the predicted future idleness.

A yet another aspect of the embodiments herein pertains to a method for prediction-based power management of a computing device. The method can include non-intrusively observing and recording, using at least one power management agent, usage and idleness information of the computing device to enable updating of an idleness database storing information based on when the computing device is idle, wherein the at least one power management agent can be operatively coupled with a power management server through a communication channel; conducting, using a neural network operatively coupled with the at least one power management agent, deep learning of one or more idleness patterns of the computing device, the one or more idleness patterns being analyzed based on machine training conducted by the neural network on the idleness database; predicting a future idleness of the computing device based on the deep learning of the one or more idleness patterns; and directly transitioning the computing device to a lower power state based on the predicted future idleness.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments described herein and its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the embodiments herein may be practiced and to further enable those of skill in the art to practice its various embodiments. Accordingly, examples should not be construed as limiting the scope of what is disclosed and otherwise claimed. In the drawings, the size and relative sizes of layers and regions may be exaggerated for clarity.

The embodiments herein provide computing devices that can enable prediction-based power management thereby transitions the device to an optimally permissible lower power consumption state directly instead of following a normally configured sequence of power state transitions with their pre-configured delays. Such a direct transition to an optimal lower power state results in maximizing energy savings. The embodiments herein include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

The embodiments herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as read only memories (ROMs), random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the embodiments herein with appropriate computer hardware to execute the code contained therein. An apparatus for practicing the embodiments herein may involve one or more computers (or one or more processors within a single computer) and storage systems containing or having network access to computer program(s) coded in accordance with various methods described herein, and the method steps of the embodiments herein could be accomplished by modules, routines, subroutines, or subparts of a computer program product.

Below are some definitions as used in accordance with the embodiments herein. "Smart devices" refer to smart computing devices that have one or more built-in power management capabilities, such as desktops, laptops, tablets, smart phones, smart televisions, smart monitors, printers, network switches, storage area networks, servers, virtual machines, smart switches, smart ups, smart air conditioners, firewalls etc. "Time duration" or "Time interval" refer to time difference between time t1 and t2. "Input components" refers to components of the devices that are directly interacting with the user (via any of the input devices like keyboard/mouse, biometric-sensor, camera, touch screen, pen/stylus, voice and other sensors. "Idleness" refers to lack of significant activity associated with User Interacting Devices and non-interacting devices such as a CPU, disk, network ports and select applications. "Idle Time Duration" refers to unbroken time duration associated with idleness of device; idleness is also called inactivity. "Idle Timeout" refers to exceeding the duration of idleness. "Power Consumption" refers to instantaneous power consumed by the device in watts. "Energy Consumption" refers to energy consumed by a device over a period of time expressed in watt-hours. "Standby" refers to a state wherein all computing tasks (other than a minimal set of services) are suspended and the device is in low power consumption state.

The embodiments described herein relate to a system, method and computing device that can analyze history of usage of an electronic device (referred to as the "device" hereinafter) and can predict probable instances where the device can be moved to a best possible lower power state without causing unwanted interruptions to a user or applications of the device. Further, transition of the device to a lower power state can be performed directly instead of following sequence of power state transitions that cause pre-configured delays. It would therefore be appreciated that embodiments described herein can aid in maximizing energy savings.

Figure 1:
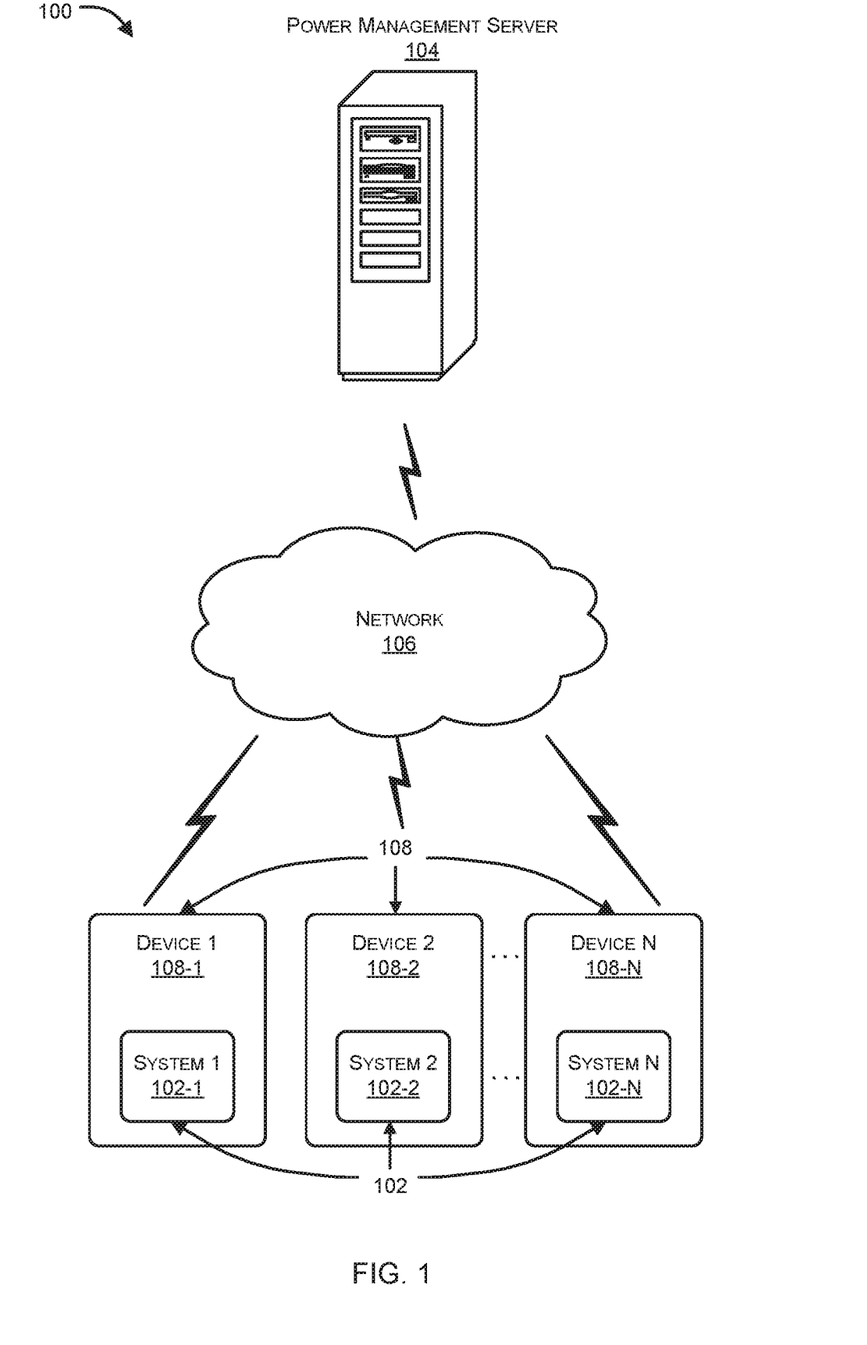
FIG. 1 illustrates an exemplary network architecture used in accordance with the embodiments herein.

FIG. 1 illustrates an exemplary network architecture used in accordance with the embodiments herein. As illustrated, a system 102, shown as system 102-1, 102-1, . . . 102-N in FIG. 1, to enable prediction-based power management (referred to as the system 102, hereinafter) can reside in electronic/smart devices 108-1, 108-2, . . . 108-N (individually referred to as the device 108 and collectively referred to as the devices 108, hereinafter). Further, the system 102 can be implemented using a power management agent that can be communicatively coupled with a power management server 104 through a network 106. In an embodiment, the device 108 can be a client machine such as modern information technology (IT) infrastructure elements. Examples of devices 108 can include but are not limited to, desktops, laptops, tablets, smart phones, smart monitors, smart televisions, printers, and the likes that can have one or more built-in power management capabilities.

The network 106 can be wireless network, wired network or a combination thereof that can be implemented as one of the different types of networks, such as an Intranet, Local Area Network (LAN), Wide Area Network (WAN), the Internet, and the like. Further, the network 106 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

According to an embodiment, the power management agent can define non-intrusiveness by maintaining a list of applications, tasks, and activities configured with the device 108 such as video players, usage of browser, virtual machine, applications of virtual machines, active downloads, active transaction in database servers, etc. In addition, the power management agent can define non-intrusiveness for new applications, adaptively. Also, the power management agent can maintain a list of dependency of the applications, tasks, and activities various power manageable components of the device 108.

In an embodiment, the power management agent can collect the intrusiveness information from one or more devices 108 and can advise an administrator of that set of devices 108 to define the optimal non-intrusiveness power configuration for each device 108. The power management agent can also collect data on the power usage, application usage, user activity, and device activity periodically from connected devices 108 and can store the data in a persistent storage. Additionally, the power management agent can provide business intelligence reports on the power usage, additional potential power savings, frequently used applications, unused applications, and potential optimizations on the resource usage.

Further, the power management agent can contain application sensors that can be threshold detectors for usage of power manageable components and can maintain a list of applications, tasks, and activities of the device 108 and definition of non-intrusiveness on the power manageable components in the device 108. Table 1 provides an exemplary list of some common applications, tasks, and activities and their dependency on power manageable components in the system 102.

TABLE 1

List of Applications/Tasks/Activities that are sensitive to power management of the devices

| Application | Interactive | Sensor Enabled | Dim Monitor | Turn-off monitor | Turn-off Hard disk | Standby Allowed | Hibernate allowed | Shutdown allowed |
| --- | --- | --- | --- | --- | --- | --- | --- | --- |
| Chrome.exe | Yes | No | Yes | Yes | Yes | Yes | Yes | Yes |
| MsWord.exe | Yes | Yes | No | No | Yes | No | No | No |
| Vlc.exe | Yes | Yes | Yes | Yes | No | No | No | No |
| Outlook.exe | Yes | No | Yes | Yes | Yes | Yes | Yes | No |

In an embodiment, the power management server 104 can perform non-intrusiveness monitoring by sending a set of monitoring commands to the power management agent in order to monitor intrusiveness on the device 108. In an embodiment, the non-intrusiveness of the device 108 described above can be defined by the power management server 102 that can interact with the power management agent.

Figure 3A:
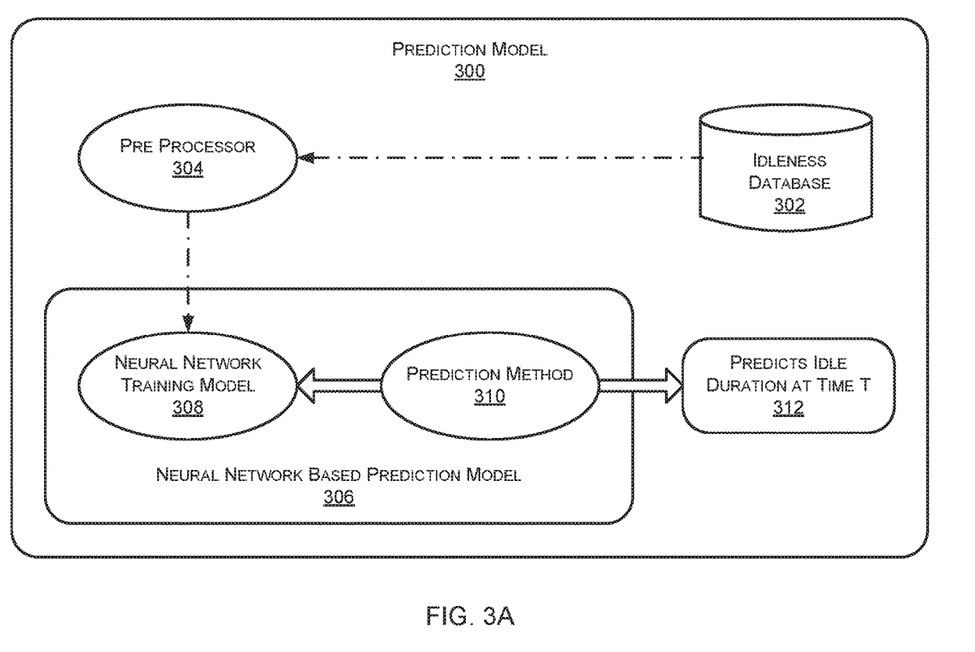
FIGS. 3A through 3D illustrate exemplary representation of various models, according to an embodiment herein.

In an embodiment, the system 102 using the power management agent can detect idleness information of the device 108 based on inputs from components such as a keyboard, mouse, biometric-sensor, camera, touch screen, pen/stylus, voice sensor, motion sensor, proximity sensor, thermal sensor, etc. that indicate interaction with a user. In an example, the device 108 can be considered to be active if there are no inputs from the input components and any of the applications/tasks/activities which are being set as 'Yes' are running in the device 108, otherwise the device 108 can be considered to be idle. The idleness information can also be based on when the device 108 is in a standby mode and/or when the device 108 is switched off. Whenever the device 108 enters into an idle state, the idle record of the device 108 can be stored in an idleness database 302 (as shown in FIG. 3A). Further, the system 102 can conduct deep learning of idleness patterns of the device 108 using the idleness database 302 such that future idleness of the device 108 can be predicted. Moreover, the system 102 can utilize the predicted future idleness to directly transition the device 108 to a lower power state.

Figure 2:
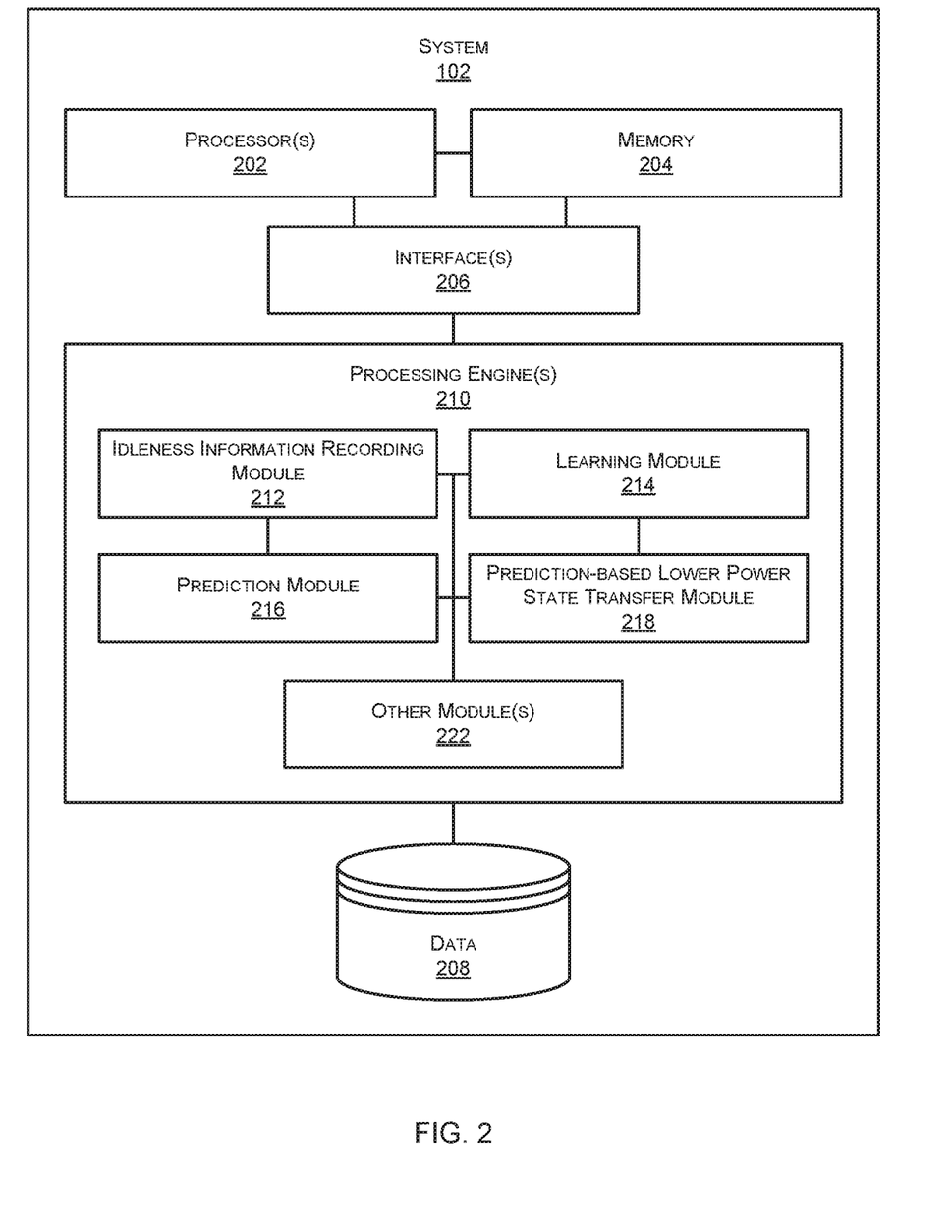
FIG. 2 is a module diagram illustrating functional units of a system to enable prediction-based power management, according to an embodiment herein.

FIG. 2, with reference to FIG. 1, is a module diagram illustrating functional units of a system 102 to enable prediction-based power management, according to an embodiment herein. As illustrated, the system 102 can include one or more processor(s) 202. The one or more processor(s) 202 can be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of the system 102. The memory 204 can store one or more computer-readable instructions or routines, which may be fetched and executed to create or share the data units over a network service. The memory 204 can include any non-transitory storage device including, for example, volatile memory such as RAM, or non-volatile memory such as EPROM, flash memory, and the like. In an example embodiment, the memory 204 may be a local memory or may be located remotely, such as a server, a file server, a data server, and the Cloud.

The system 102 can also include an interface(s) 206. The interface(s) 206 may include a variety of interfaces, for example, interfaces for data input and output devices, referred to as I/O devices, storage devices, and the like. The interface(s) 206 may facilitate communication of the system 102 with various devices coupled to the system 102. The interface(s) 206 may also provide a communication pathway for one or more components of the system 102. Examples of such components include, but are not limited to, processing engine(s) 210 and data 208.

The engine(s) 210 can be implemented as a combination of hardware and software or firmware programming (for example, programmable instructions) to implement one or more functionalities of the engine(s) 210. In the examples described herein, such combinations of hardware and software or firmware programming may be implemented in several different ways. For example, the programming for the engine(s) may be processor executable instructions stored on a non-transitory machine-readable storage medium and the hardware for the engine(s) 210 may include a processing resource (for example, one or more processors), to execute such instructions. In the examples, the machine-readable storage medium may store instructions that, when executed by the processing resource, implement the engine (s) 210. In such examples, the system 102 can include the machine-readable storage medium storing the instructions and the processing resource to execute the instructions, or the machine-readable storage medium may be separate but accessible to system 102 and the processing resource. In other examples, the engine(s) 210 may be implemented by electronic circuitry. The data 208 can include data that is either stored or generated as a result of functionalities implemented by any of the components of the engine(s) 210.

In an example, the processing engine(s) 210 can include an idleness information recording module 212, a learning module 214, a prediction module 216, a prediction-based lower power state transfer module 218, and other module(s) 220. The other module(s) 220 can implement functionalities that supplement applications or functions performed by the system 102 or the processing engine(s) 210.

In an aspect, the idleness information recording module 212 can non-intrusively observe and record usage and idleness information of the device 108. Non-intrusively can mean accessing the information without requiring special cooperation from an application of the device 108 such that the application can remain completely unchanged. The power management agent can define non-intrusiveness by maintaining a list of applications, tasks and activities and their dependency on power manageable components of the device 108. The idleness can pertain to a state when the device 108 is idle; i.e., when the device 108 enters into an inactive state, which can be determined using the power management agent configured at the device 108 that can monitor a lack of significant activity pertaining to the device 108.

In an embodiment, determination of the idleness information of a particular device 108 can be performed by checking whether any power manageable component of the device 108 is idle, whether any application is dependent on any power manageable component, and/or whether any application dependent on any power manageable component is active. The idleness information can be stored in an idleness database 302, where each record can pertain to an idle state of the device 108 by including a time stamp indicating the instance at which the idleness started and duration of the idleness.

Figure 3B:
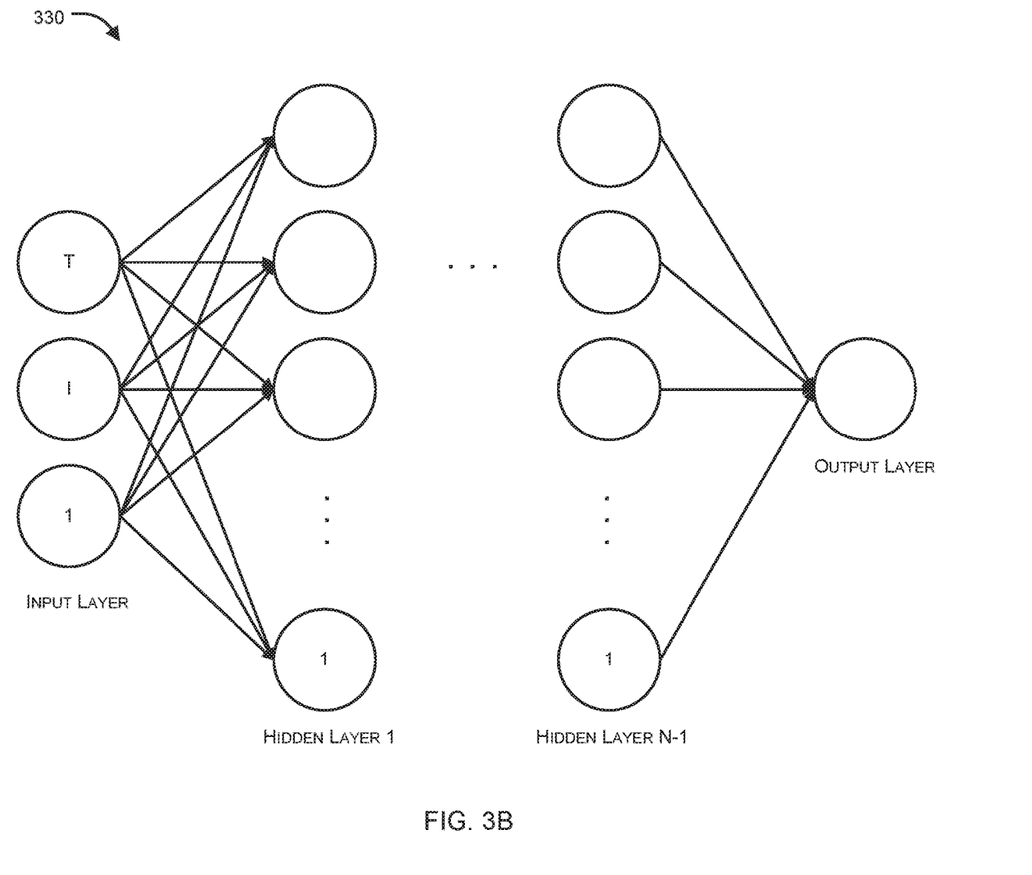

In an aspect, the learning module 214 can analyze idleness patterns of the device 108 based on machine training that can be conducted by a neural network 330 (as shown in FIG. 3B) on the idleness database 302. Further, a neural network training model 308 (as shown in FIG. 3A) can enable the neural network 330 to conduct deep learning of the idleness patterns of the device 108. Furthermore, based on the deep learning of the idleness patterns, the prediction module 216 can predict future idleness of the device 108. In an embodiment, the prediction of future idleness of the device 108 by the prediction module 216 can be based on a prediction model 300 (as shown in FIG. 3A) that can include the neural network training model 308, which is further explained in detail with reference to FIGS. 3A and 3B.

In an aspect, the prediction-based lower power state transfer module 218 can directly transition the device 108 to a lower power state based on the predicted future idleness. In addition, to perform transitioning, the prediction-based lower power state transfer module 218 can consider the time-span for which the device 108 would remain in the idle state, which can be determined by the prediction module 216. The transition of the device 108 directly to a lower power state is further explained in detail with reference to FIGS. 3C and 3D.

Although the embodiments herein are explained by considering the functional modules as a part of a system 102 that can be configured in the device 108, it would be appreciated that the same functional modules can form a part of any processor implemented computing device such as desktop, a laptop, a tablet computer, a smart phone, a mobile phone, a wearable device, a smart television, a smart monitor, a printer, a network switch, a storage area network, a communications servers, a virtual machine, an electronic device having an in-built power management capability, a smart switch, a smart uninterruptible power supply, a smart air conditioner, a firewall device, and the like so as to enable power management by determining idleness information based on inputs from keyboard, mouse, biometric sensor, camera, touch screen, stylus, voice sensor, motion sensor, proximity sensor, thermal sensor, etc of the computing device when the computing device is running without user interaction, or when the computing device is in a standby mode, or when the computing device is switched off.

FIGS. 3A through 3D, with reference to FIGS. 1 and 2, illustrate exemplary representation of various models, according to the embodiments herein. As illustrated in FIG. 3A, a prediction model 300 can be used to predict the idle duration of the device 108 at any time T. Accordingly, elements of the prediction model 300 can include: idleness database 302, a pre-processor 304, a neural network based prediction model 306 including neural network training model 308, and a prediction method 310 that can be implemented using the power management agent. Logical data flow among the elements is indicated with dashed lines. The idleness database 302 can include historical idleness information of idle times that occurred along with time-stamp at which the idleness occurred over a long period of time such as months and weeks, etc.

In an embodiment, idle time prediction, at any time T, can be considered as a supervised learning problem by the learning module 214 when accessing of training data ($X^{(i)}$, $Y^{(i)}$) is required, where input X and Y are vectors. Training data can be historical idleness information of the device 108 stored in the idleness database 302. For each idleness record, idleness occurrence time t and idleness duration I can together form $X^{(i)}$ [t, I] and idle duration form $Y^{(i)}$[I]. Therefore, idle duration can be considered as both input and output. It would be appreciated that neural networks provide a way of defining a complex, non-linear form of hypotheses $h_{W,b}$ (x), with parameters W, b. A neural network is a set of neurons, which forms a computational unit that takes $X=\{x_1, x_2, x_3 \ldots, x_n\}$ and a bias term b as input, and provides:

$$h_{W,b}(X) = f(W^T X) = f\left(\sum_{i=1}^{n} W_i x_i + b\right)$$

as output, where $f: \mathfrak{R} \rightarrow \mathfrak{R}$ is called the activation function.

According to the embodiments herein, a multi-layer perceptron neural network 330 can be considered as illustrated in FIG. 3B. As training of the neural network 330 is required before they can be used to predict the idle time at any time instant. In an embodiment, for training of the neural network 330, neural network training model 308 can define a neural network type and parameters for the neural network algorithm to perform training of the neural network 330. Once the neural network 330 is trained, the prediction method 310 can be invoked at any time to predict the idle duration of the device at time T.

According to an embodiment, the prediction approach can be divided into three phases: pre-processing, training, and prediction. At the pre-processing phase, pre-processing of observed idleness information in idleness database 302 can be performed. For example, each day can be divided into N number of intervals each with duration D. Each idleness record of the idleness database 302 can include idle duration I, time-stamp t at which idleness started. At the pre-processing stage, the preprocessor 304 can read the past idle records from pre-processor database 302 and can insert the records into a corresponding interval in the range 1 to N. There is a possibility that the idle duration I can span over K contiguous intervals, therefore, parts of each such idle duration value can be computed and assigned to the K intervals. For example, if the idle duration is 125 minutes and interval size is 60 minutes, the idleness value can be distributed as {125, 65, 5} to three contiguous intervals from where the idleness started. Similarly, all the idleness records can be stored into corresponding intervals along with time at which idle duration occurred. Therefore, each interval may contain M number of I. Once all idleness values are stored among intervals, the average and standard deviation for the set of idleness values (or idle intervals) can be calculated for each time interval in the range 1 to N. Further, based on average and standard deviation in each interval, outliers can be clipped using a formula such as average±2*standard deviation. Furthermore, two data files can be prepared one to create training data and another to create predict input data.

For preparation of the training data file, all inputs I from all intervals can be taken and transformed using a functions such as tan h( ) such that obtained trans-I values are in range 0 to 1. Similarly, time-stamp 't' in each record can also be scaled as using: scaled_t=t/24*60*60, such that scaled_t is in the range 0 to 1. Now, a record can be created using trans-I and scaled_t in the training data file as follows: {scaled_t, trans-I, trans-I}.

In the training data file, the first two columns (scaled_t, trans-I) can be the two inputs of the neural network 330 and the third column (trans-I) can be the expected output of the neural network 330, based on which backpropagation can be performed. Similarly, all input records can be stored in a training data file (not shown). It would be appreciated that the embodiments herein use the same value of the input as well as the output to perform training of the neural network 330.

For preparation of the prediction input data file, a dataset of N number of intervals, where each interval contains some idle duration values can be used. An average idle duration Average_Ik for each interval can be computed. These Average_Ik values can be stored along with the corresponding interval number as records in a prediction input file.

In the training phase, a neural network 330 with multiple hidden layers having two inputs and one output as illustrated in FIG. 3B can be considered. In the training phase, the neural network 330 can read training data file. The result obtained after feedforward can be compared with the output; i.e., trans-I and then backpropagation can be performed. Once all the training data are processed, then the neural network 330 is ready for the prediction phase.

In the prediction phase, the prediction module 216 can invoke prediction method 310, where a first input can be defined as follows: If the system 102 predicts at a given time T then T can be scaled as: scaled_T=T in seconds/24*60*60.

A second input can be defined as follows: To get the second input, T can be mapped to an interval number, say K. Then, the expected idle duration Average_Ik at $K^{th}$ interval can be read from prediction input file.

Further, Average_Ik can be transformed and scaled as performed at the pre-processing phase to prepare training data. Therefore, trans_avg_Ik can be the output of this step. Scaled_T and trans_Avg_Ik can be applied to the trained neural network 330 to calculate prediction value pred_I. As pred_I is a scaled value, the reverse scaling can be performed using the following equation: pred_I=pred_I*MaxTimeout.

Further, when the device 108 enters an idle state, based on a predicted time-span for which the device 108 would remain in the idle state 312, the prediction-based lower power state transfer module 218 can transfer the device 108 to a lower power state.

Figure 3C:
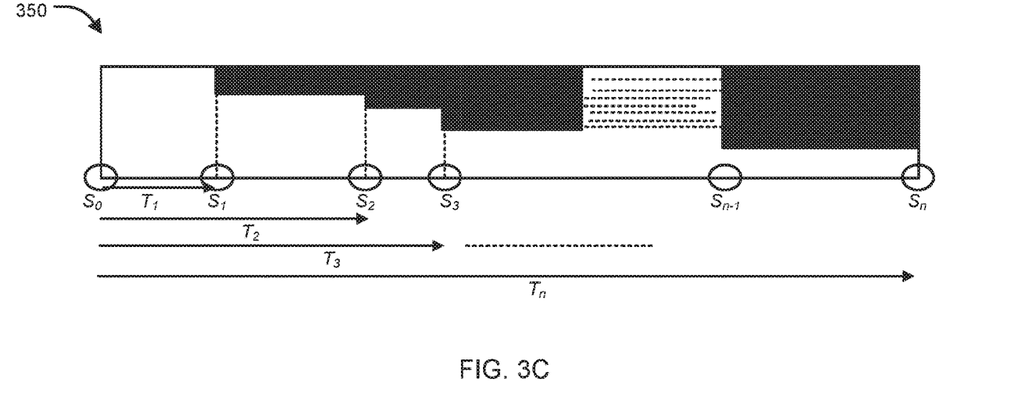

In an embodiment, prediction-based lower power state transfer module 218 can perform a power saving action at time T. For power saving, according to conventional methods the power management (PM) actions are performed sequentially; however, the prediction-based lower power state transfer module 218 can enable transitioning of the device 108 into lower power state directly and bypassing intermediate energy state changes. Referring to FIG. 3C, it can be considered that the device 108 is idle for $T_n$ units of time, and the device 108 has n number of lower power states; i.e., $S_1, S_2, \ldots, S_n$. Here, $T_1, T_2, \ldots, T_n$ are the timeouts or minimum idle durations before sending the idle device into $S_1, S_2, \ldots, S_n$ lower power state respectively to reduce overall energy consumption of the device 108. Also, $Ec_i$ can be energy consumption of the device 108 at power state $S_i$ where i=1, 2, . . . , n and $P_1 > P_2 > \ldots > P_n$, $S_0$ is the power state when the device 108 is active and $P_0$ is the power consumption at active power state $S_0$. If the predicted idle duration $I \geq T_n$ at time t, then the device 108 can be transferred up to $S_n$ lower power state. At this point if the transition of power states performed sequentially according to the conventional methods then the total energy saving can be:

$$ES_{seq} = (P_0 - P_1)(T_2 - T_1) + (P_0 - P_2)(T_3 - T_2) + \ldots + (P_0 - P_n)(T_n - T_{n-1})$$

Figure 3D:
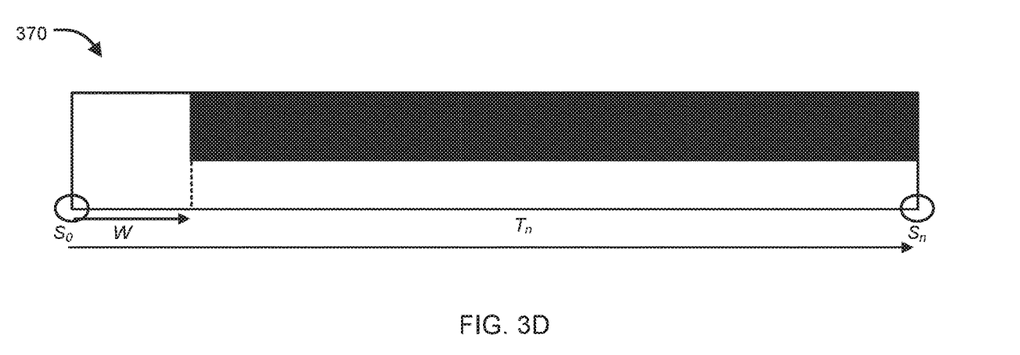

However, referring now to FIG. 3D, according to the embodiments herein, idle duration I and $I \geq T_n$ then the device 108 can be send to power state $S_n$ and total energy saving can be:

$$ES_{direct} = (P_0 - P_n)(T_n - w)$$

where w=configurable unit of time to wait and verify idleness before performing any power action.

It can be inferred that by direct power state transition, the device 108 can remain in most lower power state for $T_n - w$ unit of time which saves more energy since $ES_{direct} > ES_{seq}$.

For clarity, the above-mentioned embodiments can be explained by way of an example. For example, suppose the device 108 is idle for 50 minutes and the energy consumption of the device 108 at active state is 50 unit of energy. The corresponding timeouts for different power management actions and the energy consumption of the device 108 for associated states can be as indicated in Table 2.

TABLE 2

Timeouts for power management actions and power consumption of the device at the corresponding states

| Power Management (PM) Actions | Timeout (minutes) | Energy Consumption (Watt-hours) |
| --- | --- | --- |
| Display Turnoff | 7 | 30 |
| Sleep | 20 | 20 |
| Hibernate | 45 | 2 |

$ES_{seq}$ can be determined as:

$$ES_{seq} = (50-30)*(20-7) + (50-20)*(45-20) + (50-2)*(50-45) = 1250$$

Suppose the prediction model 300 has produced prediction value 52 which is ≥50 and configurable waiting time w=3 minutes and hence by direct transition total power saving is:

$$ES_{direct} = (50-2)*(50-3) = 2256$$

Therefore, it can be inferred that $ES_{direct} > ES_{seq}$, which would be always true. Thus, embodiments of the embodiments herein provide maximum energy saving for the device 108, thereby increasing power management efficiency.

Figure 4:
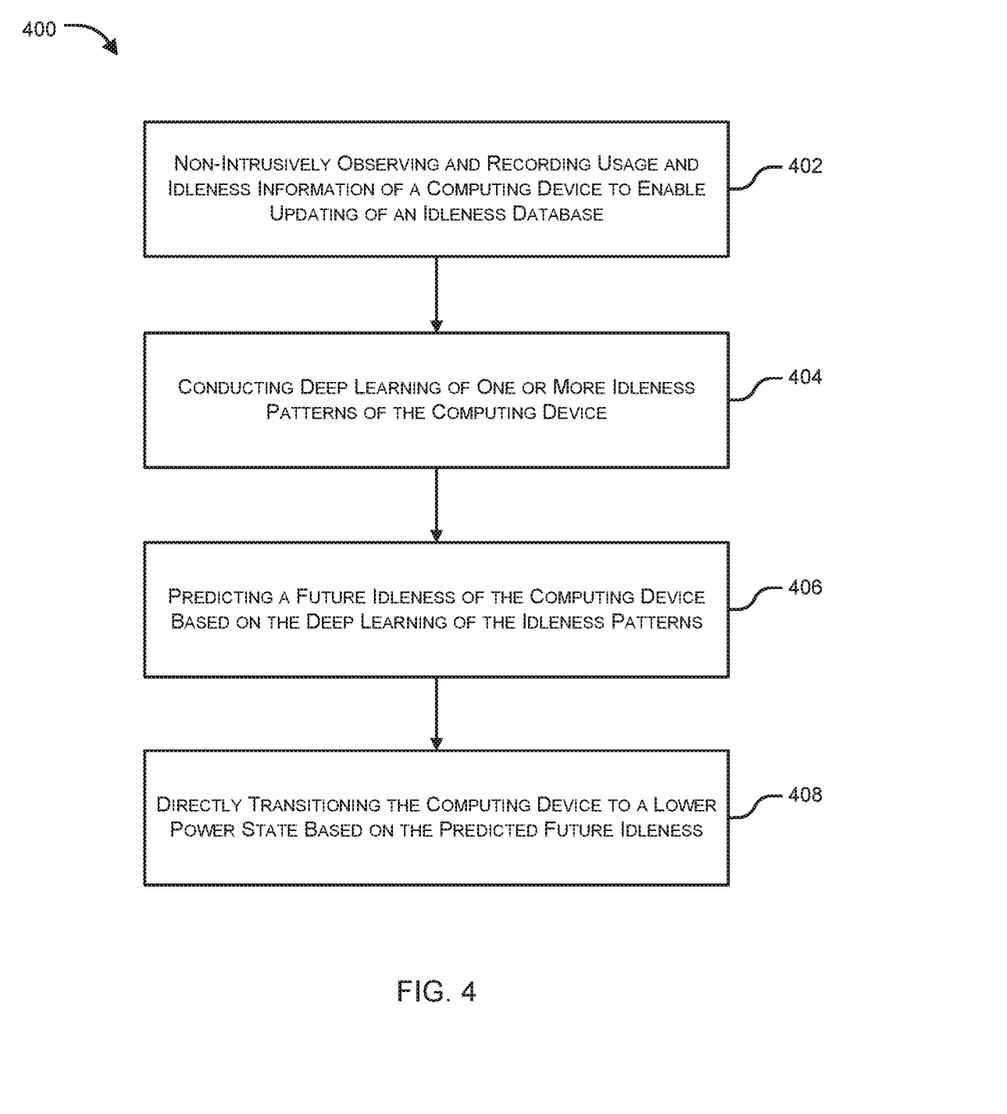
FIG. 4 is a flow diagram illustrating a method for prediction-based power management, according to an embodiment herein.

FIG. 4, with reference to FIGS. 1 through 3D, is a flow diagram illustrating a method 400 for prediction-based power management of the device 108, according to the embodiments herein. As illustrated, a method 400 for prediction-based power management on the device 108 can include a step 402 that pertains to non-intrusively observing and recording usage and idleness of the device 108 using a power management agent. The agent can update an idleness database storing information pertaining to idleness of the device 108. At step 404, using a neural network 330, deep learning of idleness patterns of the device 108 can be conducted. The idleness patterns can be analyzed based on machine training conducted by the neural network 330 on the idleness database 302. At step 406, future idleness of the device 108 can be predicted based on the deep learning of the idleness patterns. Further, at step 408, the device 108 can be transitioned to a lower power state based on the predicted future idleness.

The embodiments herein include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 5:
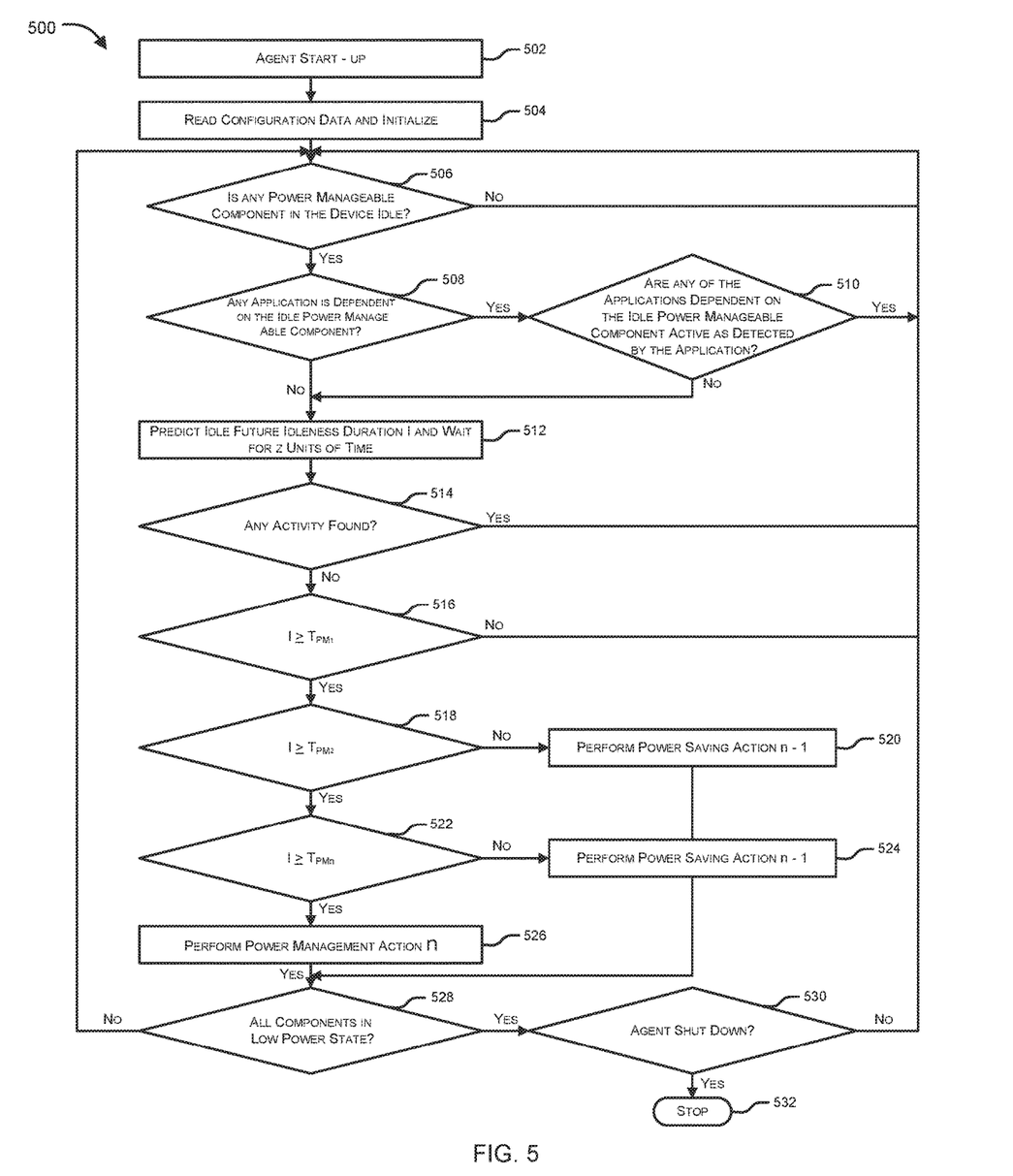
FIG. 5 is a flow diagram illustrating an exemplary working process flow for prediction-based power management, according to an embodiment herein.

FIG. 5, with reference to FIGS. 1 through 4, is a flow diagram illustrating an exemplary working process flow 500 for prediction-based power management, according to an embodiment herein. As illustrated, at steps 502 and 504, the power management agent can start up and perform initial setup/configuration. For initializing, the sensor parameters can be defined for applications used on the device 108. Further, different constraints on the power policy can be defined and idle timeout can be set with a waiting time for all different power management actions. The idle timeouts represent the time of idleness of the device 108 before performing any power management actions (such as display off, standby, hibernate etc.).

At step 506, the power management agent can continuously sense activity of the device 108 and discover if power manageable component of the device 108 is in active state or idle state, wherein if the power manageable component is in idle state then at step 508 the names of applications which are dependent on the idle power manageable component can be found. At step 510, it can be checked if any of the applications are active in the device 108, if any application is found to be active then no power management action can be performed but if no application is running then in step 512, the power management agent can invoke the prediction model 300 to predict future idleness of the device 108; i.e., for how long the device 108 would remain in idle state. The neural network 330 can learn from idleness database to predict the current idleness duration I. Further, an optimal power manageable action can be chosen. At steps 516, 518, and 522 I can be compared with timeouts of each power management (PM) actions ($T_{PM1}, T_{PM2}, \ldots T_{PMn}$) and such that $T_{PMx1}$ where $T_{PMx1} \leq I \leq T_{PMx2}$ can be selected. At steps 520, 524, and 526 power savings and power management actions can be performed. Further, at step 528 it can be determined if the components are in low power state such that the process from step 506 can be repeated if the components are not in low power stage. At step 530, if the power management agent receives a shut down instruction, the process can be stopped at step 532, otherwise the process can be continued from step 506.

According to an embodiment, a statistical methodology for predicting idleness can be utilized. As described above, the idleness database duration, such as a day, can be partitioned into 'n' intervals. Using each idleness record's time stamp; i.e., when the idleness started, the idleness value can be allocated to one of the n intervals. After scanning all records in the idleness database 302, the average and standard deviation values of idleness for all intervals can be determined. Further, outliers which are beyond some specified levels, the average±2*standard deviation can be removed and the average can be recomputed with remaining values for each interval. To predict the expected idle time at any point of time, the corresponding interval can be found, and the computed average can be used.

Figure 6:
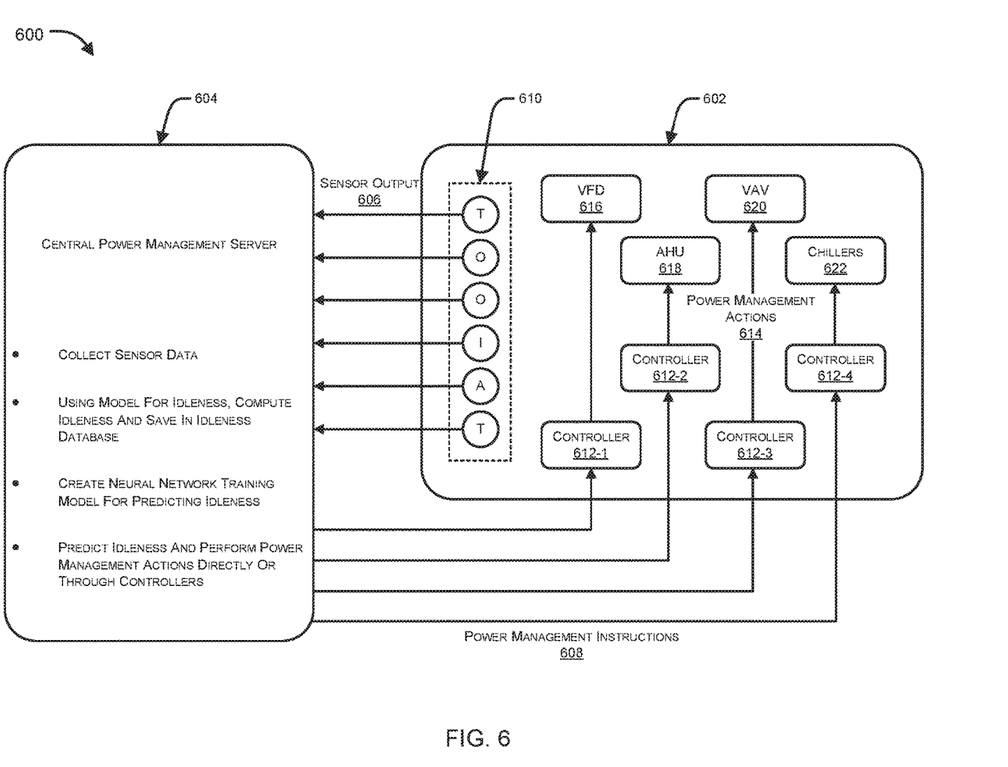
FIG. 6 illustrates utilization of the embodiments herein for power management of IT enabled non-IT devices and systems.

FIG. 6, with reference to FIGS. 1 through 5, illustrates utilization of the embodiments herein for power management of IT enabled non-IT devices and systems. As such, the embodiments herein can be utilized to save energy in IT enabled non-IT devices and systems for example traffic lights system, vehicles that commute in crowded cities daily, a machine shop of production machinery, etc. Examples of heating, ventilating and air conditioning (HVAC) and lighting systems are considered to explain implementation of various embodiments herein to enable power management in IT enabled non-IT devices and systems.

Devices/systems such as HVAC systems and lighting systems consume a lot of energy and a lot of which gets wasted. For example, there can be large areas in hospitals and other organizations that have constantly running HVAC system 602 even when people/users are not around, or equipment are switched off during many parts of the day. Similarly, lights can be on even when people/users are not around as in roads, large parking garages, enterprises, hospitals, etc. Neural network based prediction methods can be utilized by sensing idleness with respect to these equipment. HVAC, lighting, and similar systems can be enabled by IT to save energy. For sensing, many types of sensors 610 can be used such as movement recognition sensors, occupancy sensors, ambient light sensors, and temperature sensors. The output of these sensors 606 can be fed to a central computer 604 (or power management server) periodically. Several idleness levels (for example, 90%, 75% of maximum heat load) can be defined for a combined group of sensor data and as each threshold is crossed downwards or upwards, power management actions can be triggered to optimize energy usage. For example, if the number of people is less than 20% and the temperature is less than 20° C., then it can be found that 75% idleness has occurred.

An HVAC system can have subsystems such as chillers 622, variable frequency drives (VFD) 616, air handling units (AHU) 618, and variable air volume controls (VAV) 620. All the subsystems can be controlled by intelligent controllers 612-1, 612-2, 612-3, 612-4 that can permit power management actions 614 to achieve energy efficiency. Programs can be run on the central server 604 to interact with the controllers 612-1, 612-2, 612-3, 612-4 so that whenever an idleness starts, idleness can be predicted using the prediction model 300 which determines how long the idleness would continue and at what level, and the central server 604 can send power management instructions 608 to controllers 612-1, 612-2, 612-3, 612-4 which in turn can initiate power management actions 614.

In lighting systems, controllers/smart switches (such as Wi-Fi or radio enabled) (e.g., enabled as controllers 612-1, 612-2, 612-3, 612-4) can be used to perform power management actions 614. Here, the idleness can be defined with respect to the number of people present and the ambient light (e.g., day, evening, night) in the managed area of concern such as a street or a parking garage. Power management actions 614 such as on/off of a bank of lights, dimming/brightening of lights, scheduled on/off during different times of a day, etc. can be performed by controllers 612-1, 612-2, 612-3, 612-4.

According to an embodiment, based on the deep learning techniques, time-based performance schedules for the non-IT systems can also be created so that the systems and devices can be operated only at the required levels with minimal wasted output in order to ensure maximal saving of energy.

Figure 7:
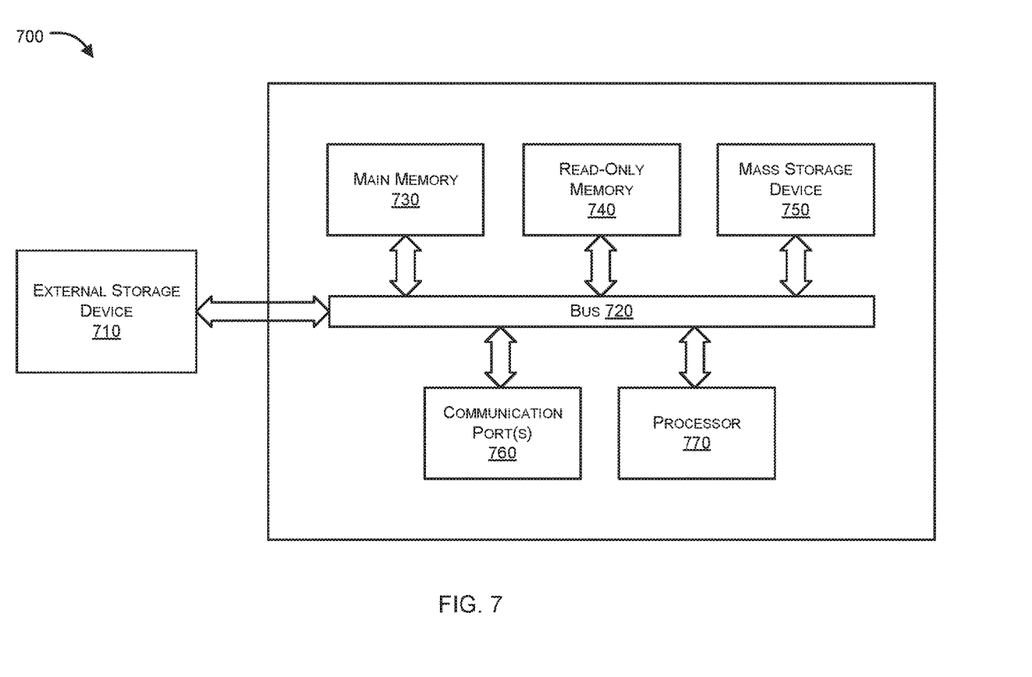
FIG. 7 illustrates an exemplary computer system used in accordance with the embodiments herein.

FIG. 7, with reference to FIGS. 1 through 6, illustrates an exemplary computer system 700 used in accordance with the embodiments herein. As shown in FIG. 7, the computer system 700 includes an external storage device 710, a bus 720, a main memory 730, a read only memory 740, a mass storage device 750, communication port 760, and a processor 770. Those skilled in the art will appreciate that computer system 700 may include more than one processor 770 and communication port 760. Processor 770 may include various modules associated with the embodiments herein. Communication port 760 can be any of an RS-232 port for use with a modem-based dialup connection, a 10/100 Ethernet port, a Gigabit or 10 Gigabit port using copper or fiber, a serial port, a parallel port, or other type of ports. Communication port 760 may be chosen depending on a network, such a Local Area Network (LAN), Wide Area Network (WAN), or any network to which computer system 700 connects.

Memory 730 can be Random Access Memory (RAM), or any other dynamic storage device commonly known in the art. Read Only Memory 740 can be any static storage device(s) such as Programmable Read Only Memory (PROM) chips for storing static information; e.g., start-up or BIOS instructions for processor 770. Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external; e.g., having Universal Serial Bus (USB) and/or Firewire interfaces), one or more optical discs, Redundant Array of Independent Disks (RAID) storage; e.g., an array of disks (e.g., SATA arrays), etc.

Bus 720 may communicatively couple processor(s) 770 with the other memory, storage, and communication blocks. Bus 720 can be, for example, a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to a software system.

Optionally, operator and administrative interfaces; e.g., a display, keyboard, and a cursor control device, may also be coupled to bus 720 to support direct operator interaction with the computer system 700. Other operator and administrative interfaces can be provided through network connections connected through communication port 760. External storage device 710 can be any kind of external hard-drives, floppy drives, zip drives, flash drives, Compact Disc-Read Only Memory (CD-ROM), Compact Disc-Re-Writable (CD-RW), Digital Video Disk-Read Only Memory (DVD-ROM), and the Cloud, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A system configured in an electronic device to enable prediction-based power management of the electronic device, the system comprising:
   an idleness information recording module configured to, using at least one power management agent, non-intrusively observe and record usage and idleness information of the electronic device so as to enable updating of an idleness database storing information based on when the electronic device is idle, wherein the at least one power management agent is operatively coupled with a power management server through a communication channel;
   a learning module configured to, using a neural network operatively coupled with the at least one power management agent, conduct deep learning of one or more idleness patterns of the electronic device, the one or more idleness patterns being analyzed based on machine training conducted by the neural network on the idleness database;
   a prediction module configured to predict future idleness of the electronic device based on the deep learning of the one or more idleness patterns;
   a prediction-based lower power state transfer module configured to directly transition the electronic device to lower power state based on the predicted future idleness; and
   an interface that communicatively links the electronic device to other electronic devices each containing its own implementation of the system,
   wherein the at least one power management agent (i) determines an optimal non-intrusiveness power configuration of the electronic device and for each of the other electronic devices based on the observed usage and idleness information of each electronic device, and (ii) identifies optimizations of resource usage of each of the electronic devices, and
   wherein outlier idleness patterns are modified using power actions timeouts before providing data into the neural network for learning and prediction.

2. The system of claim 1, wherein the at least one power management agent maintains a list of any of a combination of applications, tasks, and activities configured in the electronic device and a dependency of the applications, tasks, and activities on one or more power manageable components of the electronic device.

3. The system of claim 1, wherein the electronic device comprises a computing device, and wherein the idleness information is determined based on inputs from any of a keyboard, mouse, biometric sensor, camera, touch screen, stylus, voice sensor, motion sensor, proximity sensor, and thermal sensor of the computing device when running without user interaction, when the computing device is in a standby mode, and when the computing device is switched off.

4. The system of claim 1, wherein the electronic device comprises a heating, ventilation, and air conditioning (HVAC) device, and wherein the idleness information is determined based on inputs from any of a temperature sensor, occupancy sensor, ambient light sensor, image sensor, and a movement recognition sensor.

5. The system of claim 1, wherein recordation of the idleness information in the idleness database comprises recordation of a timestamp and idleness duration.

6. The system of claim 1, wherein the prediction-based lower power state transfer module is further configured to, when the electronic device enters an idle state and based on a predicted time-span for which the electronic device would remain in the idle state, transfer the electronic device to a lower power state.

7. The system of claim 1, wherein the non-intrusive observation and recordation of the usage and the idleness information of the electronic device is performed based on any of whether any power manageable component of the electronic device is idle, whether any application is dependent on any power manageable component, and whether any application dependent on any power manageable component is active.

8. A computing device comprising:
   a non-transitory storage device having embodied therein one or more routines configured to enable prediction-based power management of the computing device; and
   one or more processors coupled to the non-transitory storage device and configured to execute the one or more routines, wherein the one or more routines comprises:
      an idleness information recording module, which when executed by the one or more processors, through at least one power management agent, non-intrusively observes and records usage and idleness information of the computing device so as to enable updating of an idleness database storing information based on when the computing device is idle, wherein the at least one power management agent is operatively coupled with a power management server through a communication channel;
      a learning module, which when executed by the one or more processors, using a neural network operatively coupled with the at least one power management agent, conducts deep learning of one or more idleness patterns of the computing device, the one or more idleness patterns being analyzed based on machine training conducted by the neural network on the idleness database;
      a prediction module, which when executed by the one or more processors, predicts future idleness of the computing device based on the deep learning of the one or more idleness patterns;
      a prediction-based lower power state transfer module, which when executed by the one or more processors, directly transitions the computing device to a lower power state based on the predicted future idleness; and
      an interface that communicatively links the computing device to other computing devices each containing its own non-transitory storage device and one or more processors executing the one or more routines,
      wherein the at least one power management agent (i) determines an optimal non-intrusiveness power configuration of the computing device and for each of the other computing devices based on the observed usage and idleness information of each computing device, and (ii) identifies optimizations of resource usage of each of the computing devices, and wherein outlier idleness patterns are modified using power actions timeouts before providing data into the neural network for learning and prediction.

9. The computing device of claim 8, wherein the at least one power management agent maintains a list of a combination of applications, tasks, and activities configured in the computing device and a dependency of the applications, tasks, and activities on one or more power manageable components of the computing device.

10. The computing device of claim 8, wherein the computing device comprises any of a desktop, a laptop, a tablet computer, a smart phone, a mobile phone, a wearable device, a smart television, a smart monitor, a printer, a network switch, a storage area network, a communications servers, a virtual machine, an electronic device having an in-built power management capability, a smart switch, a smart uninterruptible power supply, a smart air conditioner, and a firewall device.

11. The computing device of claim 8, wherein the idleness information is determined based on inputs from any of a keyboard, mouse, biometric sensor, camera, touch screen, stylus, voice sensor, motion sensor, proximity sensor, and thermal sensor of the computing device when running without user interaction, when the computing device is in a standby mode, and when the computing device is switched off.

12. The computing device of claim 8, wherein the computing device comprises a heating, ventilation, and air conditioning (HVAC) device, and wherein the idleness information is determined based on inputs from any of a temperature sensor, occupancy sensor, ambient light sensor, image sensor, and a movement recognition sensor.

13. The computing device of claim 8, wherein the prediction-based lower power state transfer module is further configured to, when the computing enters an idle state, based on a predicted time-span for which the computing device would remain in the idle state, transfer the computing device to a lower power state.

14. The computing device of claim 8, wherein the non-intrusive observation and recording of the usage and the idleness information of the computing device is performed based on any of whether any power manageable component of the electronic device is idle, whether any application is dependent on any power manageable component, and whether any application dependent on any power manageable component is active.

15. A method for prediction-based power management of a computing device, the method comprising:
non-intrusively observing and recording, using at least one power management agent, usage and idleness information of the computing device to enable updating of an idleness database storing information based on when the computing device is idle, wherein the at least one power management agent is operatively coupled with a power management server through a communication channel;
conducting, using a neural network operatively coupled with the at least one power management agent, deep learning of one or more idleness patterns of the computing device, the one or more idleness patterns being analyzed based on machine training conducted by the neural network on the idleness database;
predicting a future idleness of the computing device based on the deep learning of the one or more idleness patterns;
directly transitioning the computing device to a lower power state based on the predicted future idleness; and
communicatively linking the computing device to other computing devices each executing its own method for prediction-based power management,
wherein the at least one power management agent (i) determines an optimal non-intrusiveness power configuration of the computing device and for each of the other computing devices based on the observed usage and idleness information of each computing device, and (ii) identifies optimizations of resource usage of each of the computing devices, and
wherein outlier idleness patterns are modified using power actions timeouts before providing data into the neural network for learning and prediction.

16. The method of claim 15, wherein the idleness information is determined based on inputs from any of a keyboard, mouse, biometric sensor, camera, touch screen, stylus, voice sensor, motion sensor, proximity sensor, and thermal sensor of the computing device when running without user interaction, when the computing device is in a standby mode, and when the computing device is switched off.

17. The method of claim 15, wherein the computing device comprises a heating, ventilation, and air conditioning (HVAC) device, and wherein the idleness information is determined based on inputs from any of a temperature sensor, occupancy sensor, ambient light sensor, image sensor, and a movement recognition sensor.

18. The method of claim 15, wherein the directly transitioning of the computing device further comprises transferring, when the computing enters an idle state, based on a predicted time-span for which the computing device would remain in the idle state, the computing device to the lower power state.

* * * * *